United States Patent
Heiss et al.

(10) Patent No.: US 6,847,612 B1
(45) Date of Patent: Jan. 25, 2005

(54) METHOD FOR REMOVING ATM CELLS FROM AN ATM COMMUNICATIONS DEVICE

(75) Inventors: Herbert Heiss, Unterhaching (DE); Raimar Thudt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/701,403

(22) PCT Filed: Feb. 26, 1999

(86) PCT No.: PCT/EP99/01242
§ 371 (c)(1),
(2), (4) Date: Nov. 28, 2000

(87) PCT Pub. No.: WO99/63715
PCT Pub. Date: Dec. 9, 1999

(30) Foreign Application Priority Data

May 28, 1998 (EP) .............................. 98109877

(51) Int. Cl.[7] .............................................. H04L 12/26
(52) U.S. Cl. .................... 370/235; 370/229; 370/395.1
(58) Field of Search ................................ 370/229, 230, 370/235, 236.2, 238.1, 395.1, 395.21, 470, 471, 473, 474, 231, 232, 233, 234, 235.1, 236, 236.1

(56) References Cited

U.S. PATENT DOCUMENTS

| | | | | |
|---|---|---|---|---|
| 5,901,147 A | * | 5/1999 | Joffe | 370/412 |
| 5,936,939 A | * | 8/1999 | Des Jardins et al. | 370/229 |
| 6,044,079 A | * | 3/2000 | Calvignac et al. | 370/395.32 |
| 6,049,527 A | * | 4/2000 | Isoyama et al. | 370/235 |
| 6,122,253 A | * | 9/2000 | Jones | 370/235 |
| 6,128,278 A | * | 10/2000 | Joffe et al. | 370/229 |
| 6,151,299 A | * | 11/2000 | Lyon et al. | 370/229 |
| 6,282,171 B1 | * | 8/2001 | Adams et al. | 370/229 |
| 6,345,037 B2 | * | 2/2002 | St-Denis et al. | 370/230 |
| 6,535,479 B1 | * | 3/2003 | Ikematsu | 370/220 |
| 6,535,484 B1 | * | 3/2003 | Hughes et al. | 370/230 |
| 2002/0089933 A1 | * | 7/2002 | Giroux et al. | 370/236 |

* cited by examiner

Primary Examiner—Frank Duong
Assistant Examiner—Michael J. Moore
(74) Attorney, Agent, or Firm—Morrison & Foester LLP

(57) ABSTRACT

A decision algorithm for discarding frames is disclosed. A method is disclosed including the application of rules which results in the limited use of the Partial Packet Discard (PPD) method and results in the ATM cells which are not assigned to a frame not being discarded. According to the described Early Packet Discard (EPD) system, all the cells in a frame, from the first cell to the last cell, are removed from an ATM communications device upon arrival in a queue. The EPD system results in no residual cells remaining from a damaged frame or from a frame which is to be removed for other reasons. Additionally, each connection has a Maximum Frame Size (MFS), which is measured in cells and depends on the connection. Thus, increased space is available for other ATM cells.

20 Claims, 3 Drawing Sheets

```
If exclude_cell(P_cell)
THEN    IF N_exclusion_credits>0
            THEN    append_cell(P_cell)
            ELSE    discard_cell(P_cell)
ELSE    IF FPD_flag=TRUE
            THEN    IF end_of_frame(P-cell)
                        THEN FPD_flag=FALSE
                        discard_cell(P_cell)
            ELSE    IF PPD_flag=TRUE
                        THEN    IF end_of_frame(P_cell)
                                    THEN append_cell(P_cell)
                                        PPD_flag=FALSE
                                    ELSE discard_cell(P_cell)
                        ELSE    decide_cell(P_cell)
```

FIG 1

```
If exclude_cell(P_cell)
THEN    IF N_exclusion_credits>0
            THEN    append_cell(P_cell)
            ELSE    discard_cell(P_cell)
ELSE    IF FPD_flag=TRUE
            THEN    IF end_of_frame(P-cell)
                        THEN FPD_flag=FALSE
                        discard_cell(P_cell)
            ELSE    IF PPD_flag=TRUE
                        THEN    IF end_of_frame(P_cell)
                                    THEN append_cell(P_cell)
                                        PPD_flag=FALSE
                                    ELSE discard_cell(P_cell)
                        ELSE    decide_cell(P_cell)
```

FIG 2A

```
IF    (CLP=0)                              //comment: unmarked frame
THEN  IF (first cell of frame)             // e.g. Current_frame_length=0
      THEN IF  (Logical_queue_length>S_PPD_0-N_exclusion_credits-MFS)OR
               [(Logical_queue_length>S_EPD_0)AND
               (Buffer_check_0=TRUE)]
           THEN discard_cell(P_cell)
               IF    end_of_frame(P_cell)=FALSE
               THEN FPD_flag=TRUE
           ELSE append_cell(P_cell)

IF  (subsequent cell of frame) //e.g. Current_frame_length >0
      THEN IF   end_of_frame(P_cell)
           THEN append_cell(P_cell)
           ELSE IF  (Logical_queue_length≥S_PPD_0-N_exclusion_credits-1)OR
                    [(Logical_queue_length>S_EPD_0)OR
                    (Buffer_check_0=TRUE)]OR
                    (Current_frame_length>MFS-1)
                THEN discard_cell(P_cell)
                    IF   remove_last_frame
                    THEN FPD_flag=TRUE
                    ELSE PPD_flag=TRUE
                ELSE append_cell(P_cell)
```

FIG 2B

```
IF    (CLP=1)
THEN IF  (first cell of frame)                  //comment: marked frame
     THEN IF  (Logical_queue_length≥S_PPD_1-N_exclusion_credits)OR    //e.g. Current_frame_length=0
              [(Logical_queue_length>S_EPD_1)AND
              (Buffer_check_1=TRUE)]
          THEN discard_cell(P_cell)
              IF  end_of_frame(P_cell)=FALSE
              THEN FPD_flag=TRUE
          ELSE append_cell(P_cell)

IF  (subsequent cell of frame)  //e.g. Current_frame_length>0
     THEN IF  end_of_frame(P_cell)
          THEN append_cell(P_cell)
          ELSE IF  (Logical_queue_length≥S_PPD_1-N_exclusion_credits-1)OR
                   [(Logical_queue_length>S_EPD_1)AND
                   (Buffer_check_1=TRUE)]OR
                   (Current_frame_length>MFS-1)
               THEN discard_cell(P_cell)
                   IF  remove_last_frame
                   THEN FPD_flag=TRUE
                   ELSE PPD_flag=TRUE
               ELSE append_cell(P_cell)
```

METHOD FOR REMOVING ATM CELLS FROM AN ATM COMMUNICATIONS DEVICE

BACKGROUND OF THE INVENTION

1. Field of the Invention

The invention is directed to a method for removal of ATM cells from an ATM communications device, having a plurality of ATM cells, a plurality of which are in each case assigned to a common frame, and which are stored in connection-specific queues B;

2. Description of the Related Art

In conventional packet communications systems, a packet has a comparatively large and variable length. One system for transmitting information in packets with fixed, predetermined lengths is referred to as the ATM (Asynchronous Transfer Mode) system. Such a system allows voice, video and data signals to be processed and transmitted in the same way. The individual packets are normally called cells. The cells each contain a cell header, whose information allows switching and/or assignment of the respective cell. In ATM communications devices, in particular communications network devices, high-speed and broadband transmission is possible at a transmission rate of more than 150 Mb/s.

One problem with ATM communications devices is the level of the transmission rate on a transmission path when a jam of ATM cells has formed there. This problem is described in detail in the German Patent Application 19810058.2. This refers to ATM systems in which a plurality of ATM cells are in each case assigned to a common frame. These frames are data packets of variable length, in a relatively narrow sense. If, for example, a cell in such a frame is lost or has been damaged, it is undesirable for the remaining cells in the same frame to be transmitted further over a transmission path of an ATM device, since the complete information in the frame would no longer be received at the end of the transmission path. The ATM system would thus be unnecessarily loaded dynamically. Particularly when a jam occurs on the transmission path, it is necessary to remove the remaining cells in the frame as quickly and effectively as possible.

It has thus been proposed for ATM cells in a specific frame to be removed in each case when an individual ATM cell arrives at the end of a queue. Such queues are used, in particular, to control a sequence of ATM cells at the end and/or at the start of a transmission path. According to a method which is described in German Patent Application 19810058.2 and which is called Partial Packet Discard (PPD), the first, and if present, other cells in the frame which are already located in the queue are not removed, but only all the newly arriving cells in the frame, with the exception of the last cell of the frame. The PPD method has the disadvantage that at least the first and the last cell in the frame still have to remain in the queue.

German Patent Application 198 400 58.2 discloses a further method, according to which all the cells in a frame, from the first cell to the last cell, are removed from the ATM communications device on arrival in a queue. This method, which is called Early Packet Discard (EPD in the following text), has the advantage that no residual cells remain from a damaged frame, or from a frame which is to be removed for other reasons, and the maximum possible space is thus available for other ATM cells. However, the EPD method cannot be applied to frames whose first cell has already been added to the queue.

The transmission of information using the Internet is an example of communication networks via which information is transmitted in packets with a comparatively large and variable length. The Internet protocol TCP/IP is used in this case, which supports the transmission of frames with a variable length. In practice, these networks have an interface to ATM networks. For this reason, the information contained in data packets has to be converted to ATM cells, and vice versa.

To this end, a frame initial code, for example, is stored which denotes that ATM cell immediately in front of the first ATM cell of the frame in the queue. This information normally exists in the cell header of the last cell of the frame namely, as a rule, in the so-called AAU bit in the cell type field (payload type field) of the cell header. Furthermore, the ATM cells are numbered so that, in the end, the majority of the ATM cells can be assigned to a data packet.

German Patent Application 198 100 58.2 describes a further method for how ATM cells can be removed when overload situations occur in a frame. This method, which is also called the LPD method, is particularly useful when a decision has been made to discard the second part of the frame while the first part is still located in the queue in the ATM system. In this case, the first part of the frame is removed from the queue, and the remaining cells are dealt with in the same way as in the EPD method. Problems always occur with the LPD method whenever cells are stored which cannot be assigned to the frame, in a relatively narrow sense.

These cells include, for example, control cells, OAM cells, or monitoring cells of a general type, which may be introduced at the subscriber end. If these cells are stored in a queue, the relevant frame can no longer be discarded, or can be discarded only with difficulty, in an overload situation.

The downward Remanow A. et al: "Dynamics of TCP Traffic over ATM networks describes a method for removal of ATM cells from an ATM communications device. The already mentioned methods such as Partial Packet Discard or Early Packet Discard are described in this document. However, the document does not address how ATM cells are discarded efficiently in the event of an overload.

SUMMARY OF THE INVENTION

The invention is based on the object of providing a way of handling cells which are not assigned to a frame, in an overload situation.

An advantageous feature of the invention is, in particular, that rules are defined via which those cells which are not assigned to a frame are still included in the queue. This ensures that the cells are not discarded when the LPD method is used. The use of the PPD method is minimized.

Advantageous embodiments include a process in which cells that are not recognized as frame cells are excluded from discarding. A connection specific length for the queue may be defined, and a constant magnitude measuring the maximum number of ATM cells per frame may be defined per connection. A further step may be provided of utilizing a number of cells which are not to be discarded on a connection-specific basis, the number of cells being the number for a particular connection which have arrived since a last end of the frame for the particular connection. Furthermore, the inventive method may limit, per queue, a number of cells which are not to be discarded and are allowed in the queue at a specific time as a parameter which is independent of the queue (N_exclusion_cells_max).

The inventive method may also calculate, per connection, a number of cells which are not to be discarded, which number results from a difference between two figures values N_exclusion_cells_max minus a present number of excluded cells in the queue. Further steps may be provided of reserving a predetermined number of cell memory location per queue (N_exclusion_cells_max) for cells which are not to be discarded, and user-related cells to some of the queue locations.

The inventive method may further comprise the steps of comparing a length of a queue to a value S_PPD_0, the value being independent of a connection, and storing no high-priority cells per connection if the length of the queue for the connection is equal to the value S_PPD_0. One may inhibit use of the first algorithm in a situation where high-priority frames do not exceed a predetermined length. The inventive method may further reserve a specific amount of buffer-storage space for high-priority cells per connection, and prohibit access of low-priority cells to the buffer-storage space.

The inventive method may further comprise the step of preventing storage of high-priority cells for a connection if the length of the queue for a given connection is of at least a further size S_PPD_1 =S_EPD_1+MFS+N_exclusion_cells_max, in which S_EPD_1 and N_exclusion_cell_max are independent of the connection and MFS is dependent on the connection.

The invention may also completely discard high-priority frames if, on arrival of the first cell of a given connection with less than MES+N_exclusion_credits, cell memory space is available in a connection-specific queue, or the connection-specific queue exceeds a threshold S_EPD_0 and a buffer-storage filling at the same time indicates that high-priority frames should be discarded.

Furthermore, the method may include discarding high-priority frames using the first algorithm if, on arrival of a cell which is neither the first nor the last cell in a frame, a connection-specific queue only provides space for at most 1+N_exclusion_credits or the connection-specific queue exceeds a connection-specific theshold value S_EPD_0 and the status of the buffer store indicates that high-priority frames should be discarded, or if the frame is longer than the user-indicated maximum number of ATM cells per frame.

Low-priority frames may be completely discarded if, on arrival of the first cell of a connection, the length of the queue for the connection is longer than a value S_PPD_1 minus N_exclusion_credits or if the length of the queue is longer than a value S_EPD_1 and a status of a buffer store indicates that low-priority frames should be discarded.

In addition some low-priority frames for a connection should be discarded using the first algorithm (the PPD method) if, on arrival of a cell which is neither the first nor the last cell in a frame, the length of the queue for the connection is greater than S_PPD_1 minus N_exclusion_credits minus 1 or the length of the queue is greater than S_EPD_1 and the status of the buffer store indicates that low-priority frames should be discarded, or if the frame is longer than the maximum number of ATM cells per frame.

The inventive method may also provide that the queue-specific value S_EPD_0 is greater than S_PPD_1 and less than S_PPD_0 -MFS-N_exclusion_cells_max. If the buffer filling level is low, high-priority frames whose first cell has been accepted and whose frame length does not exceed the maximum number of ATM cells per frame are not subjected to the first algorithm. If the buffer filling level is low, low-priority frames whose first cell has been accepted and whose frame length does not exceed the maximum number of ATM cells per frame are not subjected to the first algorithm. Finally, the inventive method may be configured such that the EPD_flag and the FPD_flag are not set at the same time.

BRIEF DESCRIPTION OF THE DRAWINGS

The invention will be explained in more detail in the following text with reference to an exemplary embodiment.

FIG. 1 is a structured English algorithm showing the first part of the algorithm which deals with the cells when cells-arrive, FIGS. 2A and 2B show the second part of the algorithm, which describes a decision function, on the basis of which the cells are discarded.

DESCRIPTION OF THE PREFERRED EMBODIMENTS

The invention is based on the assumption that ATM cells are fed to queues in an ATM communications device. Some of the cells are discarded, but the remaining cells leave the queues at a later time. Each connection has a specific maximum frame size MFS, which is measured in cells and which depends on the connection. Furthermore, it is assumed that the CLP bit in the cell type field (payload type field) of the cell header of the ATM cell is evaluated in the ATM node. The user can send information in high-priority and low-priority frames. The cells in the high-priority frames have CLP=0 (not marked), while the cells with low-priority frames have CLP=1 (marked).

In all the connections under consideration, it is assumed that the associated cells are organized in frames, with the AAU bit being set in the payload type field of the header of the last cell in the frame. Furthermore, all the ATM cells which are stored in queues should have queue-specific markings QID with the queues themselves being organized on a connection-specific basis. The queues are designed as a FIFO queue, and are in the form of an ordered list of ATM cells.

The following text is intended to define the data structure of the queues, of the global constants, and of the global variables. First, individual operations are introduced, which can be carried out on the cells. It is assumed that each of the cells has a unique identification, which is denoted P_cell. In detail, the operations are:

Cell Operations:

The following operations are carried out with ATM cells to which a valid cell identification number P_cell is assigned. In this case:

end_of_frame (P_cell) is set to the value TRUE when the end of the frame is reached, otherwise, this variable is set to the value FALSE;

exclude_cell (P_cell) is set to the value TRUE for those cells which are excluded from being discarded from the frame;

Discard_cell (P_cell) discards cells having the identification number P_cell;

Decide_cell (P_cell) designates the algorithm, as will be explained in more detail further below.

Operations on the Queue Data Structure:

The following operations can be carried out in at the queue:

append_cell (P_cell) inserts the identification number P_cell at the end of a queue;

remove_last_frame the LPD algorithm discards all the cells in the frame in question the variable returns the value TRUE if the LPD algorithm can be applied to the connection, otherwise the value FALSE.

Operation in the Buffer Contents:

The following operations can be carried out in the buffer contents:

Buffer_check_0 returns the value TRUE when the buffer contents indicate that high-priority frames (CLP=0) should be discarded, otherwise, FALSE is returned;

Buffer_check_1 returns the value TRUE when the buffer contents indicate that low-priority frames (CLP=1) should be discarded, otherwise, FALSE is returned, Data Structures in a Queue:

There is an identification number QID for each connection and the queue associated with it. This is used for storing the following data:

indication as to whether the variable "full packet discard" can be applied to the cells in the present frame (FPD_flag). This is equivalent to the statement that the LPD or EPD algorithm is used.

indication as to whether the PPD algorithm is applied to the cells in the present frame (PPD_flag).

the variable "logical queue length" denotes a cell counter which indicates the present number of cells in the queue.

the variable S_EPD_0 denotes the fixed threshold of a queue for application of the EPD algorithm to low-priority cells the variable MFS denotes the maximum frame size the variable current_frame length_denotes a cell counter which is incremented by one for the non-discarded cells of the connection which are not excluded from being discarded from the frame. The variable is reset when the last cell in a frame arrives or after the LPD method has been applied.

the variable N_exclusion_credits denotes the current amount of memory space for the cells which are not to be discarded (=N_exclusion_cells_max-number of excluded cells in the queue).

Global Constants:

The following global constants are used:

the constants S_PPD_0 and S_PPD_1 denote fixed upper limits for the queues (for all QIDs)

the constant S_EPD_1 denotes the fixed threshold for early packet discard for CLPl cells (for all QIDs)

In other variants of the algorithm, the global constants may differ for different groups of connections, and they may be connection-specific.

The following initial values are assigned:
FPD_flag=FALSE
PPD_flag=FALSE
Current_frame_length=0
N_exclusion_credits=N_exclusion_cells_max Furthermore, the following relationships apply to the above mentioned constants:
S_EPD_1>0
S_PPD_1>S_EPD_1+MFS1
S_EPD_0>S_PPD_1
S_PPD_0>S_EPD_0+MFS1, where
MFS1=MFS+N_exclusion_cells_max is valid.

The method according to the invention is described in the following text. The method according to the invention has two components. In the first part, the algorithm starts to run when cells arrive, while the second part describes a decision algorithm for discarding the frames.

The algorithm for cell arrival is described in FIG. 1. This algorithm is carried out when a cell which is assigned to a connection i is recognized by the variable P_cell. When an arriving cell is associated with a group of cells which are excluded from the discarding of the frame, this cell is initially added to the queue, provided the current number of cells which are not to be discarded in the queue is less than the maximum number of cells which are not to be discarded and are permitted by the queue, otherwise they are discarded.

If the arriving cell is not a cell which is not to be discarded, the FPD_flag is checked. If the FPD_flag has been set to the value TRUE, the cell is discarded, and if the cell represents the last cell in the frame, the FPD method is not applied to the cell which is the next to arrive.

If the FPD_flag was set to FALSE, a check is carried out to determine whether the PPD method has been applied to the current frame. If the PPD method is run, the cell is discarded unless it represents the end of the frame, otherwise this cell is transferred to the queue, and the PPD method is not applied to the next cell to arrive. If the PPD method is not used at all, other decision algorithms may be used. These then either result in application of the append_cell function or in the cell being discarded.

The second part of the decision algorithm is shown in FIG. 2. In this case, a distinction is drawn between low-priority and high-priority cells. For high-priority cells, that is to say cells with the characteristic CLP=0, this results in the following situation:

If the cell is the first cell in the frame, a decision has to be made as to whether this cell as well as the remaining cells in the frame are discarded, or whether the cell is added to the queue. Reasons for discarding the frame may be that the queue has less cell memory space available than an amount MFS1, which results from the sum of the parameters MFS+N_exclusion_credits, or that the length of the queue is above the threshold EPD_0 and the buffer store indicates that high-priority frames (CLP=0) should be discarded.

If the cell is the only cell in the frame, it is thus automatically the last cell in the frame and the FPD_flag is not set, otherwise it is set.

If the cell is not the first cell in the frame, one or more cells of the frame have been added to the queue, or else the decide_cell function would not have been used. If it is the last cell in the frame, it is accepted in any case and is added to the queue. If it is not the last cell in the frame, this cell is discarded if the following condition is satisfied:

If at the most 1+N_exclusion_credits free cell memory space is available in the queue or if the length of the queue is above the threshold EPD_0 and the buffer store indicates that high-priority frames should be discarded, or if the length of the frame is greater than the variables MFS-1. Reasons for free cell memory space in the order of magnitude of 1+N_exclusion_credits can be justified by the need to keep available sufficient space for the last cell in the frame and the possible exclusion of cells. Reasons for free cell memory space in the order of magnitude of MFS-1 may be that the cell is not the last cell in the frame and, in the situation where the length of the present frame exceeds the value MFS-1, the complete frame exceeds the value MFS. If the cell is not discarded, the first part of the frame is, if possible, removed from the queue and the FPD_flag is set. Otherwise, the PPD_flag is set.

For low-priority cells, i.e. cells with the characteristic CLP=1, the actions have a similar nature, but the thresholds are adapted in accordance with the characteristic of having low priority.

The variable Logical_queue_length indicates the length of the queue when cells arrive, and the variables current_ frame_length and N_exclusion_credits likewise indicate the values of these variables when cells arrive. Initially, the variable current_frame_length is set to 0. It is incremented to 1 when a cell which is not to be discarded is added to the queue. It is set to 0 when the end of the frame appears or when the last frame has been removed from the queue by the LPD algorithm. The first cell in the frame can be recognized by the variable current_frame_length=0. The variable N_exclusion_credits is initially set to N_exclusion_cell_max for each queue. It is decremented by 1 for this connection, when this cell, which is not to be discarded, for the connection is added to the queue. It is incremented by 1, when a cell which is not to be discarded is removed from the queue. It is equal to the variable N_exclusion_cell_max-number of cells that are not to be discarded in the queue.

The above-described method is illustrative of the principles of the present invention. Numerous modifications and adaptations thereof will be readily apparent to those skilled in this art without departing from the spirit and scope of the present invention.

What is claimed is:

1. A method for removal of ATM cells from an ATM communications device, comprising:
   assigning a plurality of ATM cells to a common frame;
   storing said plurality of ATM cells in connection-specific queues;
   removing all newly arriving cells with the exception of a first and a last ATM cell in a frame, with a first algorithm;
   removing all of the ATM cells in a frame, from a first to a last cell, on arrival in a queue from said ATM communications device;
   defining a plurality of ATM cells as not being assigned to a frame;
   indicating, by a user, at a start of a transmission process, a maximum number of ATM cells per frame;
   transmitting ATM cells, according to said maximum number of ATM cells per frame;
   ensuring that said cells which are not assigned to a frame are still included in said queue so that they are not discarded;
   discarding an associated frame when said maximum number of ATM cells per frame is exceeded, or, if said discarding is not possible, utilizing said first algorithm.

2. The method as claimed in claim 1, further comprising excluding from discarding cells which are not recognized as frame cells.

3. The method as claimed in claim 1, further comprising defining a connection-specific length for said queue.

4. The method as claimed in claim 1, further comprising defining, per connection, a constant magnitude, which is a measure of said maximum number of ATM cells per frame.

5. The method as claimed in claim 1, further comprising utilizing a number of cells which are not to be discarded on a connection-specific basis, said number of cells being the number of cells for a particular connection which have arrived since a last end of the frame for said particular connection.

6. The method as claimed in claim 1, further comprising the stop of limiting, per queue, a number of cells which are not to be discarded and are allowed in said queue at a specific time as a parameter which is independent of said queue (N_exclusion_cells_max).

7. The method as claimed in claim 1, further comprising calculating, per connection, a number of cells which are not to be discarded which number results from a difference between N_exclusion_cells_max minus a present number of excluded cells in said queue.

8. The method as claimed in claim 1, further comprising:
   reserving a predetermined number of cell memory location per queue (N_exclusion_cells_max) for cells which are not to be discarded; and
   prohibiting access of user-related cells to some of said queue locations.

9. The method as claimed in claim 1, further comprising:
   comparing a length of a queue to a value S_PPD_0, said value being independent of a connection, and storing no high-priority cells per connection if said length of said queue for said connection is equal to said value S_PPD_0.

10. The method as claimed in claim 1, further comprising:
    inhibiting use of said first algorithm in a situation where high-priority frames do not exceed a predetermined length.

11. The method as claimed in claim 1, further comprising:
    reserving a specific amount of buffer-storage space for high-priority cells per connection; and
    prohibiting access of low-priority cells to said buffer-storage space.

12. The method as claimed in claim 1, further comprising the stop of preventing storage of high-priority cells for a connection if a length of a queue for a given connection is of at least a further size S_PPD_1=S_EPD_1+MFS+N_exclusion_cells_max, in which S_EPD_1 and N_exclusion_cell_max are independent of said connection and MFS is dependent on said connection.

13. The method as claimed in claim 1, further comprising:
    completely discarding high-priority frames if, on arrival of a first cell of a given connection with less than [[MES]] MFS+N_exclusion_credits, cell memory space is available in a connection-specific queue or said connection-specific queue exceeds a threshold S_EPD_0 and a buffer-storage filling at the same time indicates that high-priority frames should be discarded.

14. The method as claimed in claim 1, further comprising the step of discarding high-priority frames using said first algorithm if, on arrival of a cell which is neither a first nor a last cell in a frame, a connection-specific queue only provides space for at most 1+N_exclusion_credits_cells or said connection-specific queue exceeds a connection-specific threshold value S_EPD_0 and a status of a buffer store indicates that high-priority frames should be discarded, or if said frame is longer than said user-indicated maximum number of ATM cells per frame.

15. The method as claimed in claim 1, further comprising completely discarding: low-priority frames if, on arrival of a first cell of a connection, a length of a queue for said connection is longer than a value S_PPD_1 minus N_exclusion_credits or if said length of said queue is longer than a value S_EPD_1 and a status of a buffer store indicates that low-priority frames should be discarded.

16. The method as claimed in claim 1, further comprising:
    discarding some low-priority frames for a connection using said first algorithm if, on arrival of a cell which is neither a first nor a last cell in a frame, a length of a queue for said connection is greater than S_PPD_1 minus N_exclusion_credits minus 1 or said length of said queue is greater than S_EPD_1 and a status of a buffer store indicates that low-priority frames should be discarded, or if said frame is longer than said maximum number of ATM cells per frame.

17. The method as claimed in claim 1, wherein a queue-specific value S_EPD_0 is greater than S_PPD_1 and less than S_PPD_0-MFS-N_exclusion_cells_max.

18. The method as claimed in claim 1, further comprising: preventing, if a buffer filling level is low, high-priority frames whose first cell has been accepted and whose frame length does not exceed said maximum number of ATM cells per frame from using said first algorithm.

19. The method as claimed in claim 1, further comprising: preventing if a buffer filling level is low, low-priority frames whose first cell has been accepted and whose frame length does not exceed said maximum number of ATM cells per frame from using said first algorithm.

20. The method as claimed in claim 1, further comprising: preventing simultaneous setting of an EPD_flag and a FPD_flag.

* * * * *